Figure 1:
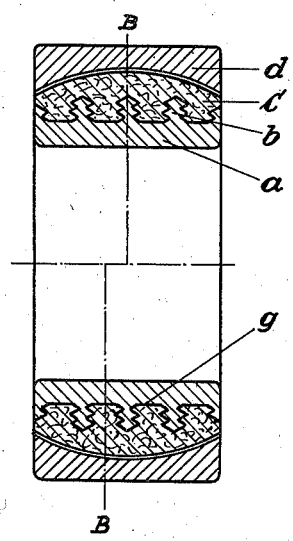

June 21, 1938.  K. ALBRECHT ET AL  2,121,277

BEARING

Filed May 12, 1936

K. Albrecht & H. Böhlk
INVENTORS

By Glascock Downing & Seebold
Attys.

Patented June 21, 1938

2,121,277

UNITED STATES PATENT OFFICE 2,121,277

BEARING

Karl Albrecht, Berlin-Niederschoneweide, and Heinrich Böhlk, Berlin-Friedenau, Germany, assignors to Ernst Bisterfeld, Radevormwald, Germany Application May 12, 1936, Serial No. 79,340
In Germany May 13, 1935

1 Claim. (Cl. 308—72)

Low heat conductivity and the difficulty of connecting bearing brasses and bushes made of pressed artificial resin substances with supporting brasses or rings stand in the way of the general adoption of such materials for this purpose. The usual bearing brass of pressed material forms a heat insulator around the shaft, so that the frictional heat cannot be transmitted to the casing, but must be conveyed away through the shaft. The heat equilibrium of such bearings therefore occurs even at low load, unless special cooling means are provided.

If the ring of pressed material be mounted on the shaft and rotates with the latter in a separate outer ring, the frictional heat is transmitted directly to the casing and the ring of pressed material obstructs the passage of heat to the shaft in the manner of a heat insulator, so that the shaft remains relatively cool. Experience shows, however, that when absorbing heat, when the bearing is in operation, the ring of pressed material becomes detached from the shaft, as the pressed artificial resin material has a considerably greater heat expansion coefficient than steel.

The ring of pressed material is prevented from easing off the shaft, if, in accordance with the invention, it be unreleasably connected to a supporting ring of steel. The steel ring is easily fixed to the shaft and, if suitably connected to the ring of pressed material, equalizes the greater heat expansion of the latter, so that the ring of pressed material substantially follows only the heat expansion of the steel ring.

In this way a bearing unit is obtained, which in accordance with the invention consists of the ring of steel and pressed material, forming the inner ring, and of the outer ring. In order to establish an unreleasable connection of the pressed material with the supporting ring, the latter is provided on its outer surface with ribs, preferably closely placed thin ribs having ring-shaped indentations disposed around their lateral surfaces, and the material is forced by a known process under pressure and heat into the spaces between the indented ribs, so that only the bottom surface of the supporting ring forms the shrinking-on base of the ring of pressed material. The known dove-tail grooves have been found to be unsuitable for the intended purpose, as there will then be two shrinkage planes. The outer ring is also placed in the pressing matrix, so that the annular space formed between the supporting ring and the outer ring can be entirely filled with the pressed-in material.

With bearings having a spherical sliding surface an inseparable unit is thus obtained, whilst with bearings having a cylindrical sliding surface the outer ring remains capable of axial displacement. The bearing clearance is formed naturally through the shrinkage of the ring of pressed material into the supporting ring, so that the bearing leaves the press ready for use.

As pressed artificial resin material has an amorphous structure, the state of tension caused by the shrinkage is gradually lost, so that the ring of pressed material will substantially follow the heat expansion of the supporting ring. This will be all the more the case, the closer the indented ribs are placed to one another and the more of the ring of pressed material the ribs enclose between them. Should the indented ribs leave a thick layer of pressed material unenclosed, this layer will follow its own heat expansion with the edges of the ribs as a base. In this way bearings may be constructed, the clearance of which decreases as the working temperature increases.

The ideas on which the invention is based are more particularly hereinafter described and are illustrated in Figs. 1 to 4 by different constructional examples.

Figure 2:
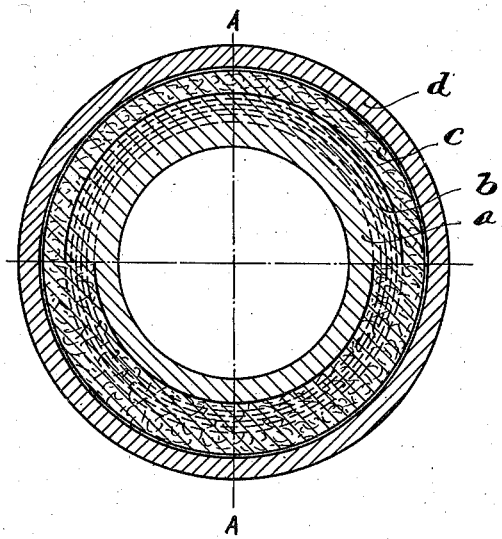
Figure 3:
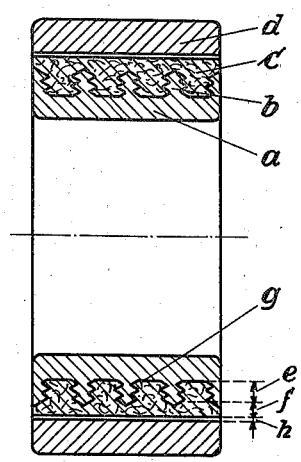
Figure 4:
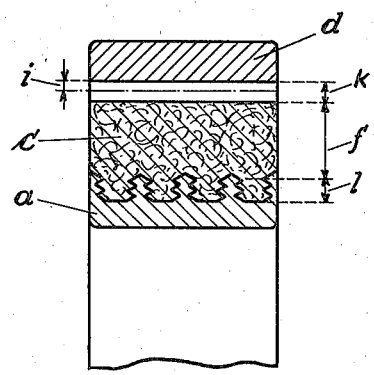

Fig. 1 shows an undividable bearing unit with a spherical running surface in longitudinal section on line A—A of Fig. 2 and Fig. 2 the same in cross-section on line B—B of Fig. 1, Fig. 3 shows a longitudinal section of a bearing unit with a cylindrical running surface and Fig. 4 a longitudinal section of a bearing of pressed material, in which the clearance diminishes as the bearing becomes hotter.

The sliding bearing of pressed material (Figs. 1 to 3) consists of the undivided supporting ring $a$ which is unreleasably connected with the undivided ring of pressed material $c$, which is pressed in between the ribs $b$ provided with ring-shaped indentations, and of the undivided outer ring $d$. The thin indented ribs $b$, the edges of which terminate close under the sliding surface, are indented at their sides and have no cylindrical surfaces which would hinder the shrinkage, so that the bottom surface $g$ of the supporting ring $a$ forms the shrinkage base of the ring $c$ of pressed material. After the ring of pressed material has finished shrinking, which will already have taken place during the pressing operation, the greater, inner portion $e$ (Fig. 3) of the ring of pressed material is enclosed between the indented ribs, so that this part must follow the heat expansion of the supporting ring, whereas the outer, smaller portion $f$ of the ring of pressed material can expand freely. Consequently the bearing clearance $h$ is substantially maintained beyond the pressing temperature.

Fig. 4 shows a constructional example of a bearing of pressed material, the clearance of which diminishes the more the bearing becomes heated. For obtaining this effect, the outer thick layer $f$ of pressed material, which is not enclosed between the indented ribs and which is subject to free expansion, is made deeper than the enclosed layer $l$ of pressed material, so that the maximum clearance $k$ of the cold state is reduced to the minimum clearance $i$ when the bearing has become warmed up during operation. Such bearings are suitable and intended for instance for accurately running machine tools. In place of the ribs $b$ with ring-shaped indentations, ribs of any other cross-sectional form, size and number may be used for unreleasably connecting the ring $c$ of pressed material to the outer surface of the supporting ring $a$.

What we claim is:—

In a plain bearing, a bearing unit comprising an undivided outer bearing ring, an undivided inner supporting ring and a rigid undivided inner bearing ring of artificial resin material formed by pressing said material concentrically between the outer bearing ring and the inner supporting ring so that the shrinkage of the artificial resin material forms the clearance between the inner and outer bearing rings, said inner supporting ring having a plurality of anchoring ribs thereon embedded in the ring of artificial resin material, said ribs having ring-shaped indentations therein, for unreleasably connecting the inner supporting ring to the bearing ring of artificial resin material, so as to prevent the inner bearing ring from becoming detached from the supporting ring owing to differential expansion.

KARL ALBRECHT.
HEINRICH BÖHLK.